United States Patent [19]

Gibson et al.

[11] 4,373,054

[45] Feb. 8, 1983

[54] DISPERSION PROCESS AND PRODUCT

[76] Inventors: David V. Gibson, 29 Sutherland Rd., Armadale, Victoria, 3143; Garry M. McKay, 1399 Dandenong Rd., Chadstone, Victoria, 3148; John E. Swalwell, 9 Amelia Crescent, East Doncaster, Victoria, 3109, all of Australia

[21] Appl. No.: 280,314

[22] Filed: Jul. 6, 1981

[30] Foreign Application Priority Data

Jul. 3, 1980 [AU] Australia .............................. PE4360
Jun. 16, 1981 [AU] Australia .............................. PE9302

[51] Int. Cl.$^3$ ............................................. C08L 61/20
[52] U.S. Cl. .................................... 524/460; 525/438; 204/181 C; 523/501; 524/901
[58] Field of Search ............... 260/29.4 UA; 525/438; 524/460, 901; 204/181 C; 523/201, 501

[56] References Cited

U.S. PATENT DOCUMENTS 4,167,499 9/1979 Hazan .......................... 260/29.4 UA
4,215,027 7/1980 Heppolette et al. ......... 260/29.4 UA

FOREIGN PATENT DOCUMENTS 1515723 6/1975 United Kingdom .
2047273 11/1980 United Kingdom .

*Primary Examiner*—Joseph L. Schofer
*Assistant Examiner*—N. Sardfim
*Attorney, Agent, or Firm*—Cushman, Darby & Cushman

[57] ABSTRACT

A process of preparing aqueous dispersions of multi-component film-forming polymer particles, suitable for use in a cathodic electrodeposition process. The disperse particles, which may be thermoplastic or thermosetting, are derived from mixtures of pre-formed polymer and addition polymer formed in situ. The process is carried out at a pH below 10 and in the presence of a selected cationic surface active agent which stabilizes the dispersion below pH 10 but renders it unstable at a pH of 10–11.

15 Claims, No Drawings

DISPERSION PROCESS AND PRODUCT

This invention relates to a process of preparing aqueous dispersions of particles of film-forming polymer, to aqueous dispersions so-prepared and to their use in coating compositions applicable to substrates by cationic electrophoretic coating processes.

In recent years, economic and environment protection pressures have accelerated the development of coating compositions in which the evolution of volatile organic solvents during the coating process is minimised and preferably eliminated entirely. This has led to the increasing use of water-dilutable liquid coating compositions and to the establishment of coating processes, for example electrophoretic deposition processes, which inherently limit the amount of volatile organic solvents released into the atmosphere. We use the expression "organic solvents" in the art-recognised sense of solvents for polymeric film-forming components of the liquid coating compositions.

A well-known method of providing water dilutable coating compositions is to produce them in the form of stable aqueous dispersions of film-forming polymer. When water evaporates from a film of such a composition, the individual disperse particles of film-forming polymer coalesce to form a continuous coating film. It is quite common for this type of dispersion to contain organic solvent at concentrations of from 2-5% of the weight of volatiles, for example to aid coalescence of the film. When the dispersion is made from pre-formed polymer, which is dispersed by mechanical means in an aqueous continuous phase, the practical requirements of the process may demand the use of higher levels of organic solvent, e.g. 20-25% of the weight of volatiles.

A particularly valuable type of aqueous polymer dispersion is one in which the disperse particles comprise an addition polymer of α, β-ethylenically unsaturated monomer. This addition polymer may be the sole film-forming polymer in the dispersion, but to meet various performance criteria, for example to meet a specified balance of minimum filming temperature, flexibility and durability, it may be necessary to blend with the addition polymer a modifier, for example a polymer plasticiser or a polymer having different physical characteristics from the said addition polymer.

It has been recognised that to achieve the best results with such mixed systems, the blending should take place within each disperse particle, as distinct from just mixing the addition polymer dispersion with a separate solution or dispersion of modifier.

Methods of preparing dispersions of that general type, which also avoid the necessity of introducing organic solvents into the system, are disclosed in, for example, British Pat. Nos. 1,417,413 and 1,421,114 which describe thermosettable synthetic addition polymer solutions and British Pat. No. 1,515,723 which describes dispersions of thermoplastic polymer solutions.

A simple process of that type is one in which a modifier, which may be pre-formed polymer or polymer plasticiser, or both, is dissolved in ethylenically unsaturated monomer and the solution stably dispersed in particulate form in water. Polymerisation of monomer is initiated to form in situ in the disperse particles an intimate blend of addition polymer and pre-formed modifier.

We are concerned in this invention with the cathodic electrodeposition of polymer onto a substrate from aqueous dispersions prepared broadly along those lines from pre-formed modifier and ethylenically unsaturated monomer.

However, we are not limited for our purpose to the particular polymers or proportions disclosed in the aforesaid patent specifications.

The general principles of the electrodeposition process itself are well publicised and the technique is widely used industrially. The article to be coated is made a target electrode in a liquid electrically conducting bath. Ionically charged coating materials present in that bath are urged to deposit on the target under the influence of an electric current applied to them. In a cathodic electrodeposition process, the coating materials bear a positive charge and deposit at a cathode.

Our invention applies to those aqueous polymer dispersions in which the positive charge is imparted to the disperse particles by cationic surface active materials associated with them and which also serve to stabilise the dispersion.

While it might appear from the foregoing that any stable aqueous dispersion of that general type would deposit coating films of adequate integrity and adhesion at a cathode, we have observed that this is not so. In practice, we have found that the pH stability of the dispersion prior to polymerisation of ethylenically unsaturated monomer is a critical step in preparing suitable dispersions for use in this way.

We have made the surprising discovery that while the aqueous dispersion of pre-formed modifier and ethylenically unsaturated monomer must be stable at the pH at which it is prepared, it must become unstable at pH 10-11 if subsequent polymerisation is to yield useful cathodically depositable compositions.

According to the present invention we now disclose a process of preparing an aqueous dispersion of particles of film-forming polymer suitable for use in a cathodic electrodeposition process, the said process consisting of the following steps in combination:

(1) Pre-formed polymer or polymer plasticiser dissolved in polymerisable α, β-ethylenically unsaturated monomer which has a maximum solubility in water of 10% by weight at 25° C. is stably dispersed in water in the presence of surface active agent; and (2) unsaturated monomer in the dispersion is polymerised to form a particulate dispersion of film-forming polymer wherein the particles comprise blends of pre-formed polymer or polymer plasticizer and polymer formed in situ from the unsaturated monomer;

characterised in that the stable dispersion in water prior to the initiation of polymerisation has a pH of less than 10 but when subjected to the pH stability test described hereinunder becomes unstable at a pH of 10-11 and the surface active agent is a cationic surface active agent which has a hydrophilic-lipophilic balance (H.L.B. value) of at least 8.

As indicated above, a critical factor in the manufacture of aqueous dispersion by our process, is the stability of the aqueous dispersion prior to polymerisation of monomer and within the pH range of 10-11.

One method of observing this is to add five drops of the dispersion taken prior to the initiation of polymerisation (about 0.15 g) to sample tubes containing 10 g of de-ionised water. One diluted sample so-produced is treated with $10^{-2}$ M potassium hydroxide solution to give a pH of 10-11 and allowed to stand, together with an un-treated diluted sample, for 10 hrs at 25° C. Instability at the high pH is indicated if there is a visible settling of polymer, with the formation of a clear upper layer, in the test sample after that time. The un-treated diluted sample should show little if any settling under the test conditions and is used as a control in assessing the degree of stability of the test sample.

Our experience has shown, however, that the test for pH stability is more accurately and more reproducibly performed if it is carried out at a constant sample concentration of monomer and pre-formed polymer/polymer plasticizer and we have chosen to standardise on a figure of 15% by weight. This is a satisfactory concentration for accurate results and being below the concentration usually selected for dispersion preparation, readily achievable by dilution of a batch sample. If much greater dilutions of test samples are used, interpretation of the results becomes less certain and while all dispersions which pass will work according to our invention, it is possible to overlook useful compositions if the testing concentration is, for example, below 1% by weight.

For the best results, our pH stability test is carried out in the following manner. Five ml of the sample of dispersion taken prior to the initiation of polymerisation is diluted in a sample tube with de-ionised water to a concentration (monomer and pre-formed polymer/polymer plasticiser) of 15% by wt. One molar potassium hydroxide solution is added dropwise to bring the pH to 11 (typically about 0.5 ml). The sample is allowed to stand for at least 2 hours together with an untreated sample. Instability at pH 11 is indicated if there is visible separation of the test liquid into two layers. Separation may be limited after two hours but is usually complete giving two clear layers after 24 hours. An untreated sample should show little if any separation under those test conditions.

As will be discussed further hereinunder, it is not necessary that our process be carried out by first dissolving the pre-formed polymer/polymer plasticiser in all of the monomer to be polymerised; although this may be done. For the purpose of this pH stability test, it is to be understood that when some variation of that basic method is used, the test is, however to be carried out on a sample prepared in just that way. That is pre-formed polymer/polymer plasticiser is dissolved in the total amount of polymerisable monomer to be used in the preparation and dispersed in water in the presence of the surface active agent then tested according to the pH stability test as described hereinabove. The test sample must be free of polymerisation initiator.

Our process imposes no inherent limitations on the choice of pre-formed polymer or polymer plasticiser other than that it must be soluble in the α, β-ethylenically unsaturated monomer in the relative proportions required in the final composition. The solution need not be completely free of any turbidity, provided it shows no obvious tendency to separate into two phases before the particulate dispersion is formed.

The actual choice of pre-formed polymer or polymer plasticiser is related to the nature of the unsaturated monomer and the intended properties of the composition as a whole.

For example, if the dispersion is intended to provide a thermoplastic coating film, the pre-formed polymer may be a thermoplastic polymer which has a glass transition temperature (Tg) significantly different from that of the polymer to be formed in situ. That is, depending on the relative physical characteristics and proportions of the two types of polymer present in the disperse particles, the effect of the pre-formed polymer may be, for example, to modify the hardness or to improve the flexibility and toughness of coating films formed therefrom by cathodic electrodeposition.

The pre-formed polymer may, but need not, be a single polymeric entity. It may be a mixture of two or more polymers, optionally in combination with a polymer plasticizer, which imparts the desired properties to the pre-formed polymer component as a whole.

The polymer plasticiser for use in these compositions may be, for example, a relatively involatile low molecular weight ester or epoxide plasticiser. Other suitable materials include, for example, those compounds referred to as polyester plasticiser.

There are few constraints on the choice of polymer to be formed in situ. However, because the composition as a whole is to provide thermoplastic films, the polymeric components of the dispersion must be free of functional groups which would render them, either singly or in combination, thermosetting at the desired temperature of film formation. We exclude double bonds from our understanding of functional groups as used herein, but it should be borne in mind that during polymerisation of unsaturated monomer it is possible for some cross-linking reactions to occur. Hence, the selection of polymerisation conditions should be made with due regard to eliminating, so far as is practicable, a level of cross-linking detrimental to the subsequent coating film formation.

In the embodiment of our invention which is intended to provide thermoset coating films, the film-forming polymer must be inherently thermosettable. That is the pre-formed polymer, polymer formed in situ or both of them must contain reactive groups capable of entering into a cross-linking reaction. In addition, the composition as a whole must contain the means of carrying out that cross-linking reaction. This may be accomplished in a number of ways.

For example, the pre-formed polymer may contain reactive groups and complementary reactive groups which will enter into the required crosslinking reaction. The reactive and complementary reactive groups may be on the same polymer or on different polymers. That is the pre-formed polymer can, if desired, be a mixture of two polymers, each of which contains one specific type of reactive group. For example, one polymer may contain hydroxyl groups and the other methylol amide groups.

Alternatively, the polymer formed in situ may provide both types of reactive groups either on the same polymer or, for example, in different polymer species built up as a layered structure within the disperse particles.

In another embodiment, the pre-formed polymer may provide one type of reactive group and the polymer formed in situ the complementary type of reactive group.

Polymer plasticiser present in the compositions need not necessarily take part in the cross-linking reaction. However, in some cases, for example when the polymer plasticiser is a flexible polyester or epoxide condensate, it can be advantageous to have the plasticiser react with and hence be chemically bonded to other polymeric film-forming components.

Thermosetting polymer systems of the abovedescribed types will usually cross-link on heating and/or on the addition of added catalysts. Cross-linking takes place by reaction between the reactive and complementary reactive groups on the film-forming polymers themselves. That is the system is self cross-linking.

However, it is well known that many cross-linking reactions take place by the reaction of polymers or polymer precursors containing reactive groups with cross-linking agents bearing complementary reactive groups. Our invention is equally applicable to such thermosetting systems. The cross-linking agents themselves may be, but are not necessarily, polymeric.

Thus, our invention comprehends the use of cross-linking agents which will react with reactive groups in either or both of the pre-formed polymer or polymer formed in situ. In one such system, both types of polymer may contain the same reactive group and be cross-linked at film formation by a common co-reative cross-linking agent.

The cross-linking agent may be incorporated in either phase of the dispersion. In fact, the choice and location of cross-linking agent is a practical one depending in each case on the nature and source of reactive groups intended to take part in the cross-linking reaction.

For example, on the one hand the cross-linking agent may be a di-epoxide which is dissolved in the pre-formed polymer and polymerisable monomer prior to preparation of the dispersion. On the other hand, the cross-linking agent may be a water-soluble polymer containing suitable reactive groups, which is added to the aqueous continuous phase of the dispersion after the dispersion has been prepared.

Suitable cross-linking agents for incorporation in our dispersions include, for example, etherified ureaformaldehyde resins, hexamethoxy methyl and other alkoxy alkyl melamines, eg. "Cymel" (Trade Mark) 1125 and 1141 and blocked isocyanate cross-linking agents as disclosed in, for example, Unites States Pat. No. 3,799,854 and British Pat. No. 1,303,480.

One particularly useful embodiment of our invention is a dispersion in which the disperse particles contain a pre-formed polymer or polymer plasticiser and polymer formed in situ, both of which contain hydroxyl groups, in combination with a cross-linking agent containing complementary reactive groups.

For example, the pre-formed polymer or polymer plasticizer may be an epoxy resin derived from epichlorhydrin and diphenylol propane and the polymer formed in situ an addition compolymer derived from monomer comprising hydroxy ethyl methacrylate, hydroxypropyl methacrylate or hydroxy isopropyl methacrylate. The cross-linking agent may then be, for example, a butylated urea-formaldehyde resin.

The means of formulating both thermoplastic and thermosetting polymers and their use in combination with plasticisers and cross-linking agents are well known to the art. Many typical examples applied to aqueous polymer dispersions are disclosed for example, in the above-mentioned patent specifications, the contents of which are incorporated herein by reference.

The selection of surfact-active agent to be used in our process is limited in the first place to those cationic materials which have an H.L.B. value of at least 8. In general, any material of this type can give an aqueous dispersion with our pre-formed polymer/monomer solutions at a pH below 10. However, as described hereinabove, unless that dispersion becomes unstable at a pH of 10–11 under our specified test conditions, the final polymer dispersion does not deposit satisfactory coating films under cathodic electrodeposition conditions.

The principles underlying the choice of the most effective surface active agent for use with a particular polymer dispersion are not clear to us. However, it is a relatively straight forward matter to determine this experimentally.

The dispersion of pre-formed polymer or polymer plasticizer and polymerisable monomer is formed at a pH of less than 10, the typical useful working range being pH 4–8. An acceptable surface active agent will produce a stable dispersion of particles of the order of 0.5–5.0 $\mu$m dia. If the chosen surface active agent does not produce a stable dispersion, or one which fails to pass our stability test, we then check the effect of using a surface active agent with a different cationic group or H.L.B. value.

The concentration of surface active agent required is typically of the order of 2–10% based on the weight of disperse particles. However, we are not limited in the performance of this invention to concentrations of that order. For example the selected surface active agent may be polymeric and contributing significantly to the nature of the ultimate coating film itself. In particular, if the dispersion is intended to provide thermosetting coating films the surface active agent may also contain a suitable reactive group allowing it to take part in the film-forming cross-linking reaction. That is, surface active agent required to stabilise the dispersion may be provided, at least in part, by pre-formed polymer or polymer plasticiser comprising stabilising cationic groups and optionally reactive groups which subsequently enter into a film-forming cross-linking reaction. The concentration of surface-active agent may then constitute, for example, as much as 40%, or even more, of the total weight of disperse particles.

Although the dispersions are essentially stabilised in our process by cationic surface active agents, they may also contain non-ionic surface active agents and may also tolerate the presence of some anionic material. It is also permitted to use a mixture of two or more cationic surface-active agents. The over-riding criterion in all cases is that the dispersion must pass our pH stability test.

Surface active agents having an H.L.B value of at least 8 include, for example, lower alkyl salts of fatty mono- and di-amines, e.g. the acetate salts of tallow and oleyl fatty primary amines and of a fatty primary amine with a fatty chain length of 18 covalently bonded carbon atoms. Similar diamines are, for example, the acetate salts of tallow and oleyl propylene diamine.

Some quaternary ammonium compounds also provide satisfactory surface active agents, for example the proprietary product Ethoquod (Trade Mark) O12.

Polymeric surface active agents include, for example, copolymers of ethylenically unsaturated monomers, the copolymers providing both lipophilic components and cationic groups. Such materials include for example, copolymers of lauryl methacrylate/methyl methacrylate/hydroxy propyl methacrylate/diethylaminoethyl methacrylate and 2-ethyl hexyl acrylate/methyl methacrylate/hydroxy ethyl methacrylate/dimethylaminoethyl methacrylate; when protonated by an acid, e.g. acetic acid.

The polymeric surface active agent need not, however, be an addition copolymer. A most useful material of this type is, for example, an epoxyphenol adduct reacted with diethanolamine and activated with acetic acid.

Numerous methods have been proposed for the determination of H.L.B. values of surface active agents, several of which are reviewed in Part II of "Emulsions and Emulsion Technology", Marcel Dekker Inc., New York, edited by Kenneth J. Lissant. Particularly in the case of polymeric, cationic materials, most determinations are time-consuming and tedious. For the purpose of this invention, we have found that satisfactory accuracy is given by the approxmate determination given on page 740 of that publication.

According to that method, the H.L.B. value of a surface active agent is estimated by observing its dispersibility in water aided if necessary by first melting or softening it in water, then cooling to room temperature. The formation of a stable, milky dispersion, translucent dispersion or clear solution, approximates to various levels of H.L.B value from 8 upwards. Materials which will not disperse or give poor dispersions in water have lower H.L.B values than are desirable for our purpose.

Methods of making aqueous dispersions of polymer solutions are well known and directly applicable to our process. Suitable techniques are described, for example, in the above-mentioned patent specifications, which also exemplify the manner in which polymerisation of monomer in the disperse particles may be initiated.

For example, pre-formed polymer or polymer plasticiser may be dissolved in polymerisable monomer and that solution poured into mechanically agitated water where, in the presence of cationic surface active agent, a stable particulate dispersion of polymer solution is formed. The surface active agent may be pre-dissolved in the water or, if suitably soluble, added as a solution in the pre-formed polymer solution. An alternative method which can be useful when the pre-formed polymer or polymer plasticiser is liquid at the temperature of addition, is to add both that component and the polymerisable monomer concurrently to the water in the presence of the surface active agent. Dissolving of pre-formed polymer or polymer plasticiser in polymerisable monomer and the formation of liquid disperse particles then proceeds concurrently.

A further useful variation is to add the solution in polymerisable monomer continuously over a period of time to water in the presence of the surface active agent and polymerisation initiator. The formation of liquid disperse particles and initiation of polymerisation then takes place concurrently and continuously.

When the pre-formed polymer or polymer plasticiser comprises polymeric surface active agent, we usually prefer to dissolve it in part or all of the polymerisable monomer, before proceeding to make the initial aqueous dispersion.

It will be apparent from the above description of our process, that considerable latitude is available in the manner in which initiation of polymerisation may be carried out. That is, polymerisation initiator may be added to the solution in polymerisable monomer, the aqueous phase of the dispersion or to both. Alternatively, in the case of a redox catalyst for example, one component may be segregated into each phase and only become effective when they are mixed. In general we have found that a more stable process results if the complete initiator system is not contained in the polymerisable monomer solution.

The relative proportions of pre-formed polymer or polymer plasticiser, cross-linking agent when present and polymer formed in situ are selected according to the properties required in the final coating film. Usually however, the weight of polymer formed in situ will be 20–98% of the total weight of film-forming polymer present.

As mentioned hereinabove, our dispersions can be made essentially free of volatile organic solvents. However, if desired, for example to enhance the flow of coating films formed from them, they may be made with a proportion of such solvents present.

The aqueous dispersions may be compounded in conventional manner into pigmented coating compositions by the incorporation therein of pigment, anti-corrosive additives and other conventional auxiliary materials. When the dispersions are thermosettable, they may contain accelerators for the crosslinking reaction.

Although intended specifically for use in cationic electrodeposition baths and processes, the aqueous dispersions of our process may also be applied to substrates, including non-conducting substrates, e.g. wood and plastics mouldings, by other conventional means, e.g. by spraying, curtain coating, roller coating, dipping or the like.

The invention is illustrated by the following examples in which all parts are given by weight:

EXAMPLE 1

Preparation of an aqueous dispersion of particles of pre-formed polyester resin blended with an addition copolymer formed in situ, according to the invention.

The polyester resin used in this example was a saturated polyester formulation made from neopentyl glycol, adipic acid, isophthalic acid, terephthalic acid and trimellitic anhydride. It was dissolved in methyl methacrylate monomer to give a solution containing 82.3% by weight of solid polyester resin.

A portion of 60.8 parts of the above solution was thinned further with 14.2 parts methyl methacrylate monomer, 20 parts of butyl acrylate, 5 parts of N-(n-butoxymethyl) acrylamide and 1 part of cumene hydroperoxide.

The solution so-formed was added with stirring to 30 parts of dimineralised water containing 8 parts of a tallow propylene diamine acetate salt (Duomac* T—Trade Mark), which has an H.L.B. value of greater than 8. During this addition the batch was stirred at 2500–3000 r.p.m with a disc cavitation stirrer. Stirring was maintained for 10 mn.

A dispersion of pre-formed polymer in polymerisable monomer was formed and this was further diluted by the addition of 200 parts of dimineralised water. The disperse particles had an average diameter of about 1 μm. The dispersion had a pH of 5.2.

A sample of the dispersion was subjected both to the above-described stability test at 15% solids by weight and to an inspection when five drops thereof were diluted with 1 g de-ionised water, adjusted to a pH of 10.5 and allowed to stand for 10 hours at 25° C. In each case, the test sample showed clear evidence of loss of stability, with marked settling of particles. That is, the selected stabiliser was satisfactory for use in our process.

A solution of 0.5 parts of sodium ascorbate in 20 parts of demineralised water was stirred into the dispersion to initiate polymerisation. An exotherm was observed, the batch temperature rising 20° C. in 47 mn.

On completion of polymerisation, the batch was used as a bath in an electrodeposition process, using phosphated steel panel electrodes and a potential drop of 200 V for 30 seconds deposition time.

An even, well-coalesced film of polymer was deposited on and adhered well to the cathode. On removing from the bath and curing by baking for 30 mn at 190° C. a smooth, glossy, adherent film was formed.

EXAMPLE 2

An attempt was made to repeat the process of example 1, but substituting a blend of surface active agents for the one used in that example.

A duplicate solution of pre-formed polymer in polymerisable monomer to that used in example 1 was prepared and added in like manner to an aqueous solution of surface active agent. In this example, the 8 parts of Duomac T dissolved in 30 parts of demineralised water was replaced by a mixed surface active agent consisting of 8 parts of Duomac T and 5 parts of a nonyl alcohol ethoxylate (40 ethylene oxide units) known as Triton (Trade Mark) N 40. That mixture of surface active agents had an HLB value in excess of 8. A further 16 parts of demineralised water was added and mixing continued for another 10 mins. The batch was then thinned with a further 179 parts of demineralised water, yielding a dispersion of polymer particles of 1.0–2.5 μm dia., which was stable at pH 5.2.

When subjected to the above-mentioned stability test, the dispersion remained stable at a pH of 10–11 for the full duration of the test.

The dispersion was subjected to the polymerisation conditions described in example 1 and similarly subjected to testing in a cathodic electrodeposition bath.

The deposit on the cathode was thick but lacked adhesion to the electrode; in contrast to the film of example 1.

EXAMPLE 3

Preparation of a thermosetting aqueous dispersion according to the invention in which both pre-formed polymer and polymer formed in situ contain reactive groups and the disperse particles comprise a cross-linking agent.

A solution of 37.5 parts of a 16% by wt. solution of the di-acetate of a tallow propylene diamine (Duomac T—Trade Mark) in 100 parts de-ionised water dispersed under high shear using a Silverson emulsifier, into the following solution:

| | |
|---|---|
| epoxy resin* | 40.0 parts |
| methyl methacrylate | 33.0 parts |
| butyl acrylate | 22.0 parts |
| hydroxyisopropyl methacrylate | 5.0 parts |
| cross-linker** | 25.0 parts |
| alkyl tert. amine*** | 12.0 parts |
| cumene hydroperoxide | 1.0 parts |

*epoxide equivalent 182–194. Epikote (Trade Mark) 828.
**Cymel (Trade Mark) 1125 or 1141
***Ethomeen (Trade Mark) C 12

A further 112 parts of de-ionised water was added and the high shear maintained for a further 5 minutes.

The surface active agent had an HLB value in excess of 8 and the stable dispersion so-formed when tested as hereinabove described at a solids of 15% by wt. destabilised at a pH of 11.

A solution of 0.4 parts ascorbic acid in 20 parts of de-ionised water was then added with gentle stirring and the batch allowed to exotherm (typically 25°→45° C.)

When the temperature returned to ambient, a further 200 parts de-ionised water were added and the dispersion so-formed was dialysed overnight according to common commercial electrodeposition practices.

The dispersion had a pH of 6.3 and particle size of 0.3 μm.

A coating of good integrity and adhesion was deposited electrophoretically on a cathode at a film build of 80 μm, with a coulomb yield of 120 mgm per coulomb. Cross-linking of the coating was achieved by stoving the film for 20 mn at 180° C.

Similar results were obtained when a blocked isocyanate cross-linking agent of the type described in example III of U.S. Pat. No. 3,799,854 was substituted from the Cymel resin. When using the blocked isocyanate it was also necessary to include 0.5 parts of dibutyl tin dilaurate in the initial dispersion.

EXAMPLE 4

Preparation of polymeric surface active agents with an HLB value in excess of 8.

450 parts of an epoxy resin—Epikote (Trade Mark) 1001—and 70 parts of phenol were melted and blended together. A charge of 26 parts of diethanolamine was added to the batch cautiously at 100° C., the temperature raised to 150° C. and maintained for 2 hrs or until the epoxide value of the batch dropped to zero. The product is referred to hereinunder as Agent A.

A second surface-active agent was prepared in a similar manner from 900 parts of Epikote (Trade Mark) 1004, 76 parts of p-nitrophenol and 48 parts of diethanolamine. In this case, after the two components were blended, stirring was carried out at 170° C., not 150° C. The product is referred to hereinunder as Agent B.

EXAMPLE 5

Preparation of a dispersion according to the invention using Agent A from example 4 as surface-active agent to stabilise the dispersion.

250 parts of de-ionised water were added under conditions of high shear as described in example 3 to the following solution:

| | |
|---|---|
| Agent A | 40.0 parts |
| methyl methacrylate | 32.5 parts |
| butyl acrylate | 7.5 parts |
| hydroxybutyl acrylate | 15.0 parts |
| Cymel 1125 (ref. example 1) | 25.0 parts |
| cumene hydroperoxide | 2.0 parts |
| octyl mercaptan | 0.5 parts |
| acetic acid | 1.1 parts |

This dispersion showed the desired instability at pH 11, when subjected to our stability test.

A solution of 0.3 parts ascorbic acid and 0.15 parts of ferrous sulphate in 50 parts of de-ionised water was added with gentle stirring to the batch, which then exothermed gently (typically 25°→45° C.).

The dispersion so-formed had a pH of 4.5, particle size of the order of 2.5 μm and deposited a coating film to a thickness of 40 μm on a cathodic in an electrophoretic deposition bath with a coulomb yield of 95 mg/coulomb. Deposition time was approx. 2 mn at 25° C. and at a pressure of 200 volts.

The film cured to a hard, smooth coating when stoved for 20 mn at 180° C. It showed excellent toughness and adhesion and resistance to salt spray corrosion.

As with the dispersion of example 3, the alternative cross-linking agents Cymel 1141 and the blocked isocyanate gave equally satisfactory results. A soluble urea-formaldehyde resin also produced acceptable films when used as an alternative cross-linking agent.

EXAMPLE 6

Preparation of a dispersion according to the invention using Agent B from example 4 as surface active agent to stabilise the dispersion.

This dispersion was prepared by the general method of example 3, but using the components listed hereunder as the corresponding addition stages and starting with 250 parts of de-ionised water.

| | |
|---|---|
| Agent B | 40.0 parts |
| methyl methacrylate | 22.0 parts |
| butyl methacrylate | 10.0 parts |
| butyl acrylate | 13.0 parts |
| hydroxyethyl methacrylate | 10.0 parts |
| hydroxybutyl acrylate | 5.0 parts |
| Cymel 1125 (or 1141) | 25.0 parts |
| n-butanol | 2.0 parts |
| cumene hydroperoxide | 2.0 parts |
| octyl mercaptan | 0.5 parts |
| acetic acid | 1.2 parts |

The dispersion became unstable at pH 11 as required by our pH stability test.

Polymerisation was then initiated as in example 5 using the following initiator system:

| | |
|---|---|
| ascorbic acid | 0.4 parts |
| ferrous sulphate | 0.15 parts |
| de-ionised water | 40.00 parts |

The dispersion so-formed had a particle size of about 0.28 μm and a pH of 4.6. It deposited in a cathodic electrodeposition cell to a thickness of 43 μm at 2 mn at 28° C. and under a pressure of 200 volts. The coulomb yield was 72 mg per coulomb.

When cross-linked by stoving for 20 minutes at 180° C. the deposited coating film was smooth and tough, with good adhesion to the substrate. It had good resistance to salt spray corrosion.

EXAMPLE 7

Preparation of a dispersion according to the invention using Agent A of example 4 and thermal polymerisation initiation.

250 parts of di-ionised water were dispersed by the general method of example 3 into the following solution:

| | |
|---|---|
| Agent A | 40.0 parts |
| methyl methacrylate | 33.0 parts |
| butyl acrylate | 22.0 parts |
| hydroxy isopropyl methacrylate | 5.0 parts |
| Cymel 1125 | 25.0 parts |
| acetic acid | 1.0 parts |
| azodiisobutyronitrile | 1.0 parts |

The resulting aqueous dispersion was unstable at pH 11 when subjected to our pH stability test. It was heated on a steam bath to 90°-100° C. with gentle stirring for 5 hrs then cooled to room temperature.

The final dispersion had a particle diameter of the order of 0.35 μm and when tested as described in example 3 it produced smooth coating films of good integrity and adhesion. The alternative cross-linking agents of that example again produced satisfactory cross-linked films when used with this dispersion.

EXAMPLE 8

Effect of varying the level of pre-formed polymer or polymer stabiliser on the properties of a dispersion of the type disclosed in example 3.

Five dispersions were prepared by the general method of example 3 but using the components listed hereinunder as the corresponding preparation stages.

| | DISPERSION NO. - Parts | | | | |
|---|---|---|---|---|---|
| | 1 | 2 | 3 | 4 | 5 |
| 16% Duomac T solution | 25 | 25 | 25 | 25 | 25 |
| de-ionised water | 225 | 225 | 225 | 225 | 225 |
| Epikote 828 | 60 | 50 | 40 | 30 | 20 |
| methyl methacrylate | 21 | 27 | 33 | 38 | 44 |
| butyl acrylate | 14 | 18 | 22 | 27 | 31 |
| hydroxy isopropyl methacrylate | 5 | 5 | 5 | 5 | 5 |
| Cymel 1125 | 20 | 20 | 20 | 20 | 20 |
| Ethomeen C12 | 12 | 12 | 12 | 12 | 12 |
| cumene hydroperoxide | 1 | 1 | 1 | 1 | 1 |
| ascorbic acid | 0.4 | 0.4 | 0.4 | 0.4 | 0.4 |
| water | 20.0 | 20.0 | 20.0 | 20.0 | 20.0 |

All dispersions prior to polymerisation were stable and passed our pH stability test. All produced stable dispersions which deposited films of good integrity and adhesion under the test conditions described in example 3. This was not materially affected by changes in the selected cross-linking agent.

Compositions comprising higher levels of epoxy resin showed decreasing long-term stability and less satisfactory cure. The cured films were somewhat sticky. At the same time, the films derived from higher epoxy content dispersions showed generally superior resistance to corrosion. The preferred compositions comprised 30–50% by wt epoxy resin with the overall best balance of properties being shown at 40% epoxy resin content.

EXAMPLE 9

Effect of some alternative cross-linking agents on dispersions stabilised with Agent A of example 4.

The following dispersions were prepared by the general method of example 3, but using the components listed hereunder as the corresponding addition stages and starting each preparation with an initial change of 250 parts of de-ionised water.

| | Dispersion No. - Parts | | | | | | |
|---|---|---|---|---|---|---|---|
| | 1 | 2 | 3 | 4 | 5 | 6 | 7 |
| Agent A | 40 | 40 | 40 | 40 | 40 | 40 | 40 |
| methyl methacrylate | 33 | 33 | 33 | 33 | 33 | 33 | 33 |
| butyl acrylate | 22 | 22 | 22 | 22 | 22 | 22 | 22 |
| methylisobutyl methacrylate | 5 | 5 | 5 | 5 | 5 | 5 | 5 |
| Duomeen C 12 | 12 | 12 | 12 | 12 | 12 | 12 | 12 |
| cumene hydroperoxide | 1 | 1 | 1 | 1 | 1 | 1 | 1 |
| acetic acid | 1 | 1 | 1 | 1 | 1 | 1 | 1 |
| Cymel 303 | 20 | — | — | — | — | — | — |
| Cymel 1141 | — | 23 | — | — | — | — | — |
| Cymel 1156 | — | — | 20 | — | — | — | — |
| Cymel 1125 | — | — | — | 23 | — | — | — |
| Cymel 1170 | — | — | — | — | 20 | — | — |

-continued

| | Dispersion No. - Parts | | | | | | |
|---|---|---|---|---|---|---|---|
| | 1 | 2 | 3 | 4 | 5 | 6 | 7 |
| UFR 65 | — | — | — | — | — | 20 | — |
| UFR 80 | — | — | — | — | — | — | 20 |
| ascorbic acid | 0.4 | 0.4 | 0.4 | 0.4 | 0.4 | 0.4 | 0.4 |
| de-ionised water | 20.0 | 20.0 | 20.0 | 20.0 | 20.0 | 20.0 | 20.0 |

Cross-linking agents in these formulations are further identified as follows:
Cymel 303—highly methylated M.F. resin
Cymel 1141—highly alkylated M.F. resin
Cymel 1156—highly butylated M.F. resin
1125—highly alkylated benzoguanamine resin
1170—highly alkylated glycoluril resin
UFR 65—highly methylated U.F. resin
UFR 80—highly butylated U.F. resin ("Cymel" is a Trade Mark of American Cyanamid Co., USA)

The resulting dispersions had the following characteristics:

| | 1 | 2 | 3 | 4 | 5 | 6 | 7 |
|---|---|---|---|---|---|---|---|
| Particle size ($\mu$m) | 0.27 | 0.25 | 0.19 | 0.34 | 0.4 | 0.34 | 0.22 |
| pH | 6.6 | 6.4 | 6.4 | 6.2 | 6.0 | 6.2 | 6.2 |

Films deposited electrophoretically on a cathode in 2 mn at 25° C. and at 200 volts had the following characteristics:

| | 1 | 2 | 3 | 4 | 5 | 6 | 7 |
|---|---|---|---|---|---|---|---|
| Film thickness ($\mu$m) | 30 | 23 | 20 | 25 | 26 | 27 | 21 |
| Coulomb yield (mgm/coulomb) | 91 | 90 | 107 | 83 | 93 | 67 | 94 |
| Cure | fair | good | fair | good | poor | good | poor |

EXAMPLE 10

Effect of surface active agent level on film characteristics.

The following dispersions were prepared by the general method of example 3, but using the components listed hereunder as the corresponding addition stages.

| | Dispersion No. - parts | | | |
|---|---|---|---|---|
| | 1 | 2 | 3 | 4 |
| de-ionised water | 500.0 | 500.0 | 500.0 | 500.0 |
| Duomac T | 16.0 | 8.0 | 4.0 | 2.0 |
| Epikote 828 | 40.0 | 40.0 | 40.0 | 40.0 |
| methyl methacrylate | 33.0 | 33.0 | 33.0 | 33.0 |
| butyl acrylate | 22.0 | 22.0 | 22.0 | 22.0 |
| hydroxyisopropyl methacrylate | 5.0 | 5.0 | 5.0 | 5.0 |
| cross-linking agent* | 20.0 | 20.0 | 20.0 | 20.0 |
| Ethomeen C 12 | 12.0 | 12.0 | 12.0 | 12.0 |
| hexyl Cellosolve (Trade Mark) | 5.0 | 5.0 | 5.0 | 5.0 |
| cumene hydroperoxide | 1.0 | 1.0 | 1.0 | 1.0 |
| ascorbic acid | 0.4 | 0.4 | 0.4 | 0.4 |
| de-ionised water | 20.0 | 20.0 | 20.0 | 20.0 |

*may be chosen from Cymel 1125, Cymel 1141, U.F.R. 65 (see example 9) or a blocked isocyanate according to example 3.

All dispersions prior to polymerisation destabilised according to our pH stability test at pH 11. The particle sizes were of the order of 0.18 $\mu$m, 0.28 $\mu$m, 0.25 $\mu$m and 0.27 $\mu$m respectively.

Satisfactory films of good adhesion were produced by cathodic electrodeposition using 200 volts for 2 mn at 25° C. and cross-linking the films by stoving for 30 mn at 180° C. The cathode was a phosphate pre-treated steel panel Deposition characteristics were as follows:

| | 1 | 2 | 3 | 4 |
|---|---|---|---|---|
| Film thickness ($\mu$m) | 20 | 45 | 57 | 100 |
| Yield (mgm/coulomb) | 36 | 70 | 122 | 190 |

It is apparent, for the particular dispersion studied, that both deposited film thickness and coulomb yield increased as the surface active agent level decreased.

EXAMPLE 11

Effect of different fatty surface active agents on dispersion deposition characteristics.

The following dispersions were prepared by the general method of example 3, but starting in each case with 250 parts of de-ionised water and using the components listed hereunder as the corresponding addition stages.

| | Dispersion No. - Parts | | | | | | | |
|---|---|---|---|---|---|---|---|---|
| | 1 | 2 | 3 | 4 | 5 | 6 | 7 | 8 |
| Epikote 1001 | 40.0 | 40.0 | 40.0 | 40.0 | 40.0 | 40.0 | 40.0 | 40.0 |
| methyl methacrylate | 33.0 | 33.0 | 33.0 | 33.0 | 33.0 | 33.0 | 33.0 | 33.0 |
| butyl acrylate | 22.0 | 22.0 | 22.0 | 22.0 | 22.0 | 22.0 | 22.0 | 22.0 |
| hydroxyisopropyl methacrylate | 5.0 | 5.0 | 5.0 | 5.0 | 5.0 | 5.0 | 5.0 | 5.0 |
| cross-linking agent[x] | 20.0 | 20.0 | 20.0 | 20.0 | 20.0 | 20.0 | 20.0 | 20.0 |
| Ethomeen[xx] C12 | 12.0 | 12.0 | 12.0 | 12.0 | 12.0 | 12.0 | 12.0 | 12.0 |
| cumene hydroperoxide | 1.0 | 1.0 | 1.0 | 1.0 | 1.0 | 1.0 | 1.0 | 1.0 |
| Duomeen[xx] O | 3.0 | — | — | — | — | — | — | — |
| Duomeen C | — | 5.7 | — | — | — | — | — | — |
| Duomeen S | — | — | 3.0 | — | — | — | — | — |
| Duomeen T | — | — | — | 3.0 | — | — | — | — |
| Ethoquad[xx] O/12 | — | — | — | — | 4 | — | — | — |
| Ethoduomeen[xx] T/13 | — | — | — | — | — | 3.3 | — | — |
| Ethoduomeen T/20 | — | — | — | — | — | — | 3.5 | — |
| Ethomeen T/12 | — | — | — | — | — | — | — | 3.4 |
| acetic acid | 1.0 | 1.1 | 1.0 | 1.0 | — | 0.7 | 0.5 | 0.6 |
| ascorbic acid | 0.4 | 0.4 | 0.4 | 0.4 | 0.4 | 0.4 | 0.4 | 0.4 |

-continued

| | Dispersion No. - Parts | | | | | | | |
|---|---|---|---|---|---|---|---|---|
| | 1 | 2 | 3 | 4 | 5 | 6 | 7 | 8 |
| de-ionised water | 100.0 | 100.0 | 100.0 | 100.0 | 100.0 | 100.0 | 100.0 | 100.0 |

*may be selected from Cymel** 1125, Cymel 1141 UFR 80 or blocked isocyanate according to example 3.
**Trade mark.

The individual surface active agents under test are further identified as follows:
Duomeens—alkyl propylene diamines, the alkyl group of the particular member being derived as follows:
O—oleic
C—coco
S—soya
T—tallow
Ethoquad O/12—a polyethoxylated quaternary ammonium salt, containing an oleyl alkyl group and 2 mol of ethylene oxide.
Ethoduomeen T/13—a reaction product of an N-alkyl trimethylenediamine containing a "tallow" alkyl group and 3 mol of ethylene oxide.
Ethoduomeen T/20—as for T/13 but with 10 mol ethylene oxide.
Ethomeen T/12—a tertiary amine having a "tallow" alkyl group and 2 ethylene oxide groups attached to the nitrogen.

All dispersions prior to polymerisation exhibited instability as required by our pH instability test at a pH of 11.
The dispersion so-prepared had the following characteristics:

| | 1 | 2 | 3 | 4 | 5 | 6 | 7 | 8 |
|---|---|---|---|---|---|---|---|---|
| Particle size (μm) | 0.35 | 0.43 | 0.43 | 0.31 | 0.27 | 0.22 | 0.28 | 0.28 |
| pH | 6.2 | 6.1 | 6.2 | 6.4 | 7.4 | 7.0 | 7.0 | 6.7 |

All dispersions deposited coherent films of good adhesion when tested as for example 10. The deposition characteristics were as follows:

| | 1 | 2 | 3 | 4 | 5 | 6 | 7 | 8 |
|---|---|---|---|---|---|---|---|---|
| Film thickness (μm) | 55 | 40 | 55 | 60 | 200 | x | x | 80 |
| Yield (mgm/coulomb) | 104 | 89 | 100 | 130 | 200 | 200 | 165 | 180 | x thick but uneven films.

EXAMPLE 12

Effect of using epoxy resins of increasing molecular weight as pre-formed polymer or polymer plasticiser.
The following dispersions were prepared by the general method of example 3, but starting in each case with a solution of 16 parts of Duomac T in 300 parts of de-ionised water and using the components listed hereunder as the corresponding addition stages.

| | Dispersion No. - parts | | | |
|---|---|---|---|---|
| | 1 | 2 | 3 | 4 |
| Epikote 828 | 40.0 | — | — | — |
| Epikote 1001 | — | 40.0 | — | — |
| Epikote 1004 | — | — | 40.0 | — |
| Epikote 1007 | — | — | — | 40.0 |
| methyl methacrylate | 33.0 | 33.0 | 33.0 | 33.0 |

-continued

| | Dispersion No. - parts | | | |
|---|---|---|---|---|
| | 1 | 2 | 3 | 4 |
| butyl acrylate | 22.0 | 22.0 | 22.0 | 22.0 |
| n-butoxy methacrylate | 5.0 | 5.0 | 5.0 | 5.0 |
| UFR 80 | 22.0 | 22.0 | 22.0 | 22.0 |
| Ethomeen C 12 | 6.0 | 6.0 | 6.0 | 6.0 |
| cumene hydroperoxide | 1.0 | 1.0 | 1.0 | 1.0 |
| ascorbic acid | 0.4 | 0.4 | 0.4 | 0.4 |
| de-ionised water | 20.0 | 20.0 | 20.0 | 20.0 |

All dispersions were unstable at pH 11 when subjected to our pH stability test.
The dispersions so-formed had the following characteristics:

| | 1 | 2 | 3 | 4 |
|---|---|---|---|---|
| Particle size (μm) | 0.25 | 0.25 | 0.31 | 0.9 |
| pH | 4.6 | 4.6 | 4.6 | 4.7 |

Films deposited from these dispersions and tested according to example 10 had the following characteristics:

| | 1 | 2 | 3 | 4 |
|---|---|---|---|---|
| Film thickness (μm) | 41 | 24 | 14 | 44 |
| Corrosion protection after 21 days in salt spray | Excellent | V. Good | V. Good | Adequate |
| Film appearance | Good | Good | Some orange peel effect | Poor |

EXAMPLE 13

Preparation of a thermoplastic aqueous dispersion according to the invention, in which the polymer formed in situ contains no reactive group.
Example 1 was repeated but with the 5 parts of N-(n-butoxy methyl) acrylamide being replaced with 5 parts of n-butyl acrylate. The dispersion was prepared and evaluated as for the dispersion in Example 1. The dispersion behaved in a similar fashion in the stability test and after polymerisation and deposition gave films similar in appearance to those of Example 1. The films were, however, thermoplastic.

EXAMPLE 14

Comparative example showing the effect of a surface active agent which leads to the dispersion not destabilising at pH 11 in the above mentioned stability test.
Example 3 was repeated except that the 12.0 parts of the alkyl tert. amine were replaced with 12.0 parts of a long ethoxylate (50 moles ethylene oxide) fatty amine, Ethomeen T60 (Trade Mark) which has a H.L.B. value greater than 8.
When subjected to the stability test the dispersion remained stable at pH 11. After polymerisation it was found that this composition failed to deposit satisfactory films.

We claim:

1. A process of preparing an aqueous dispersion of particles of film-forming polymer suitable for use in a cathodic electrodeposition process, the said process consisting of the following steps in combination:
   (1) Pre-formed polymer or polymer plasticiser dissolved in polymerisable $\alpha, \beta$-ethylenically unsaturated monomer which has a maximum solubility in water of 10% by weight at 25° C. is stably dispersed in water in the presence of surface active agent; and
   (2) unsaturated monomer in the dispersion is polymerised to form a particulate dispersion of film-forming polymer wherein the particles comprise blends of pre-formed polymer or polymer plasticizer and polymer formed in situ from the unsaturated monomer;

characterised in that the stable dispersion in water prior to the initiation of polymerisation has a pH of less than 10 but when subjected to the pH stability test described hereinunder becomes unstable at a pH of 10-11 and the surface active agent is a cationic surface active agent which has a hydrophilic-lipophilic balance (H.L.B. value) of at least 8.

2. A process of preparing an aqueous dispersion according to claim 1, characterised in that when five drops of the dispersion taken prior to the initiation of polymerisation are added to 10 g of de-ionised water, treated with $10^{-2}$ M potassium hydroxide solution to give a pH of 10-11 and allowed to stand for 10 hr at 25° C., a visible settling of polymer with the formation of a clear upper layer takes place in the sample under test.

3. A process for preparing an aqueous dispersion according to claim 1 characterised in that the particulate dispersion of film-forming polymer provides a thermoplastic coating film.

4. A process of preparing an aqueous dispersion according to claim 3 characterised in that the preformed polymer is a mixture of two or more polymers, optionally in combination with a polymer plasticiser.

5. A process of preparing an aqueous dispersion according to claim 1 characterised in that the particulate dispersion of film-forming polymer provides a thermoset coating film.

6. A process of preparing an aqueous dispersion according to claim 5 characterised in that the preformed polymer contains reactive groups and complementary reactive groups which will enter into a cross-linking reaction.

7. A process of preparing an aqueous dispersion according to claim 5 characterised in that polymer formed in situ contains reactive groups and complementary reactive groups which will enter into a cross-linking reaction.

8. A process of preparing an aqueous dispersion according to claim 5 characterised in that the pre-formed polymer provides one type of reactive group and the polymer formed in situ the complementary type of reactive group.

9. A process of preparing an aqueous dispersion according to claim 5 characterised in that it contains polymer plasticizer which will bond chemically to other polymeric film-forming components.

10. A process of preparing an aqueous dispersion according to claim 5 characterised in that the dispersion contains cross-linking agent which will react with reactive groups in pre-formed polymer or polymer plasticizer, polymer formed in situ, or in both of them.

11. A process of preparing an aqueous dispersion according to claim 10 characterised in that both pre-formed polymer or polymer plasticiser and polymer formed in situ contain hydroxyl groups and the cross-linking agent contains complementary reactive groups.

12. A process of preparing an aqueous dispersion according to claim 11 characterised in that the cross-linking agent is incorporated in the disperse phase of the dispersion.

13. A process of preparing an aqueous dispersion according to claim 5 characterised in that the surface active agent is polymeric and contains a reactive group allowing it to take part in the film-forming cross-linking reaction.

14. An aqueous dispersion of particles of film-forming polymer prepared by a process as claimed in claim 1.

15. A process of depositing a coating film on a substrate by cationic electrodeposition characterised in that the deposition bath consists essentially of an aqueous dispersion of particles of film-forming polymer according to claim 15.

* * * * *